(12) United States Patent
Issari et al.

(10) Patent No.: US 7,837,824 B2
(45) Date of Patent: Nov. 23, 2010

(54) REACTIVE POLYORGANOSILOXANES HAVING CONTROLLED MOLECULAR WEIGHT AND FUNCTIONALITY

(75) Inventors: Bahram Issari, Rocky Hill, CT (US); Lester D. Bennington, East Hartford, CT (US); Robert Cross, Rocky Hill, CT (US); John Kerr, West Hartford, CT (US); Thomas Fay-Oy Lim, Killington, CT (US); Hsien-Kun Chu, Wethersfield, CT (US); Mathias E. Liistro, Jr., Plainville, CT (US); Douglas N. Horner, Bristol, CT (US)

(73) Assignee: Henkel Corporation, Rocky Hill, CT (US)

( * ) Notice: Subject to any disclaimer, the term of this patent is extended or adjusted under 35 U.S.C. 154(b) by 682 days.

(21) Appl. No.: 11/813,893

(22) PCT Filed: Jan. 18, 2006

(86) PCT No.: PCT/US2006/002006

§ 371 (c)(1),
(2), (4) Date: Jul. 13, 2007

(87) PCT Pub. No.: WO2006/078885

PCT Pub. Date: Jul. 27, 2006

(65) Prior Publication Data

US 2008/0105374 A1     May 8, 2008

Related U.S. Application Data

(60) Provisional application No. 60/645,562, filed on Jan. 20, 2005.

(51) Int. Cl.
  *B29C 65/00* (2006.01)
  *C04B 37/00* (2006.01)
  *C08F 283/12* (2006.01)
  *C08G 77/04* (2006.01)

(52) U.S. Cl. ............. 156/325; 156/304.1; 522/99; 528/34

(58) Field of Classification Search ........... 156/304.1, 156/325; 522/99; 528/34
See application file for complete search history.

(56) References Cited

U.S. PATENT DOCUMENTS

| 5,091,440 | A * | 2/1992 | Griswold ............ 522/99 |
| 5,663,269 | A | 9/1997 | Chu et al. |
| 2003/0143177 | A1 | 7/2003 | Stella |
| 2003/0216536 | A1 * | 11/2003 | Levandoski et al. ....... 528/10 |

* cited by examiner

*Primary Examiner*—Philip C Tucker
*Assistant Examiner*—Michael N Orlando
(74) *Attorney, Agent, or Firm*—Steven C. Bauman

(57) ABSTRACT

The present invention relates to photoradiation and/or moisture curing silicone compositions and methods for producing and using the same. In particular, the methods of the present invention permit controlled growth of a polymer, and allow for incorporation of pendant functional groups along the length of the polymer.

19 Claims, 1 Drawing Sheet

| | 0 Moisture | | 24 Hour Moisture | | | 72 Hour Moisture | | | 7 Day Moisture | | |
|---|---|---|---|---|---|---|---|---|---|---|---|
| | UV 15 Sec. | UV 30 Sec. | UV 0 Sec. | UV 15 Sec. | UV 30 Sec. | UV 0 Sec. | UV 15 Sec. | UV 30 Sec. | UV 0 Sec. | UV 15 Sec. | UV 30 Sec. |
| Tensile psi | 90 | 115 | 141 | 126 | 123 | 150 | 120 | 134 | 139 | 127 | 73 |
| Elongation % | 407 | 196 | 475 | 300 | 169 | 341 | 232 | 157 | 340 | 200 | |
| Shore 00 | 50 | 74 | 73 | 65 | 77 | 75 | 75 | 82 | 73 | 79 | |

FIG. 1

REACTIVE POLYORGANOSILOXANES HAVING CONTROLLED MOLECULAR WEIGHT AND FUNCTIONALITY

CROSS REFERENCE TO RELATED APPLICATIONS

This application represents a U.S. National Phase of International Patent Application No. PCT/US2006/002006, filed Jan. 18, 2006, which claims the benefit of an earlier filing date from U.S. Provisional Application No. 60/645,562, filed Jan. 20, 2005.

FIELD OF THE INVENTION

The present invention relates to photoradiation and/or moisture curing silicone compositions and methods for preparing and using the same. In particular, the methods of the present invention permit controlled growth of a polymer, and allow for incorporation of pendant functional groups along the length of the polymer.

BACKGROUND OF THE INVENTION

Silicone polymers are used to serve a wide variety of needs. For example, silicone polymers are used as adhesives, lubricants and sealants. Many factors contribute to shaping the qualities which will both characterize the polymer and ultimately determine its use.

The molecular weight of a cured silicone polymer is frequently of significant importance, and silicone polymers possessing molecular weights within a specific range are thus often required. However, a polymer's molecular weight can be difficult to obtain within a desired range.

Similarly, the manner in which a silicone polymer is cured plays a large role in determining the particular qualities that will be possessed by the cured polymer. Due to the nature of the methods traditionally used in the synthesis of silicone polymers, curing groups are often located at the terminal ends of the polymer. In such cases, cross-linking will not occur along the length of the polymer, thereby limiting the polymer's strength.

SUMMARY OF THE INVENTION

The present invention provides a photoradiation and/or moisture curing composition which includes a compound of Formula (I), having the structure:

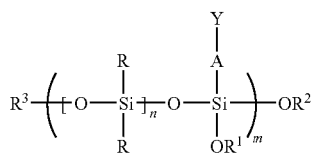

Formula (I)

wherein
m is 10-2000;
n is 10-2000;
R in each occurrence can be the same or different and is H or $C_1$-$C_3$ alkyl;
$R^1$ is H or $C_1$-$C_3$ alkyl;
$R^2$ is H or $C_1$-$C_3$ alkyl;
$R^3$ is H, $C_1$-$C_3$ alkyl, or —Si($OR^1$)($OR^2$)-A-Y;
A is $C_1$-$C_3$ alkylene; and
Y is H or a group capable of free radical polymerization and containing at least one of: an unsaturated double bond; an epoxide ring; or and episulfide ring.

In another embodiment, the present invention relates to a photoradiation and/or moisture curing silicone composition, and to the reaction product of:
a) at least one siloxane having the formula:

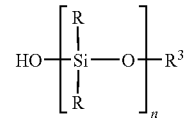

wherein
n is 10-2000;
R is $C_1$-$C_3$ alkyl; and
$R^3$ is H, $C_1$-$C_3$ alkyl, or —Si($OR^1$)($OR^2$)-A-Y; and
b) less than one equivalent of a silane having the formula

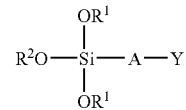

wherein
$R^1$ is H or $C_1$-$C_3$ alkyl;
$R^2$ is H or $C_1$-$C_3$ alkyl;
A is $C_1$-$C_3$ alkylene; and
Y at each occurrence is either the same or different, and is H or a group capable of free radical polymerization and containing at least one of: an unsaturated double bond; an epoxide ring; or an episulfide ring.

In a further embodiment, the present invention relates to a method of controlling the molecular weight and/or the inclusion of functional groups in the formation of a reactive polyorganosiloxane through the steps of:
a) selecting an approximate desired molecular weight of the reactive polyorganosiloxane to be made;
b) providing a hydroxy-terminated polyalkylsiloxane of desired molecular weight; and
c) reacting the hydroxyl-terminated polyalkylsiloxane of step b) with an amount less than a molar equivalent of a trialkoxy $C_1$-$C_3$ alkylsilane for a time sufficient to form a chain extended reactive polymer having pendant functional groups along the polymer backbone.

With the inventive method, the moles of the reactants may be adjusted to provide a silicone polymer having a molecular weight within a desired range. For example, the molecular weight of hydroxy terminated siloxane back-boned polymers can be increased by reaction with precise concentrations of α, β, or γ-silanes containing hydrolysable groups, at levels which allow chain growth through reaction with the silanol functionality, while at the same time avoiding consumption of silanol functional groups prior to chain growth. In addition to allowing control of molecular weight, the present inventive process provides a means of synthesizing silicone polymers with functional groups situated along the backbone of the polymer, thereby providing more opportunities for cross-linking. The number of functional groups may be determined by the total number of chain growth steps. Furthermore, a wide variety of functional groups may be accommodated by this methodology, allowing for variation in reactivity, and for both moisture and/or photoradiation cure. Moreover, different types of functional groups may be accommodated in the same polymer. Among the functionalities contemplated by the invention are α-silanes. The relatively higher reactivity of α-silanes allows for greater control over reaction conditions, providing better reproducibility and stability of desired formulations.

In another aspect, the invention also provides a method of controlling the viscosity of a reactive polyorganosiloxane including the steps of:
a) selecting an approximate desired viscosity of the reactive polyorganosiloxane to be made;
b) providing a hydroxy-terminated polyalkylsiloxane; and
c) reacting the hydroxy-terminated polyalkylsiloxane of step b) with a trialkoxy $C_1$-$C_3$ alkylsilane, wherein the trialkoxy $C_1$-$C_3$ alkylsilane is present in an amount such that the resulting reactive polyorganosiloxane has the desired viscosity.

BRIEF DESCRIPTION OF THE DRAWINGS

FIG. 1 shows properties of a typical composition of the invention when treated with a 70 mj/cm$^2$ medium pressure mercury arc lamp, followed by treatment with moisture.

DETAILED DESCRIPTION OF THE INVENTION

The present invention is directed toward a photoradiation and/or moisture curing composition that includes siloxane polymers with various pendant and terminal functional groups.

In one embodiment, the present invention provides a photoradiation and/or moisture curing composition which includes a compound of Formula I having the structure:

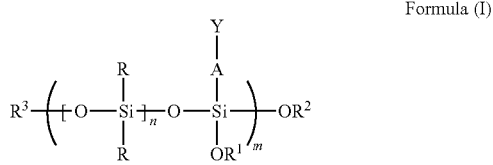

Formula (I)

wherein
m is 10-2000;
n is 10-2000;
R in each occurrence can be the same or different and is H or $C_1$-$C_3$ alkyl;
$R^1$ is H or $C_1$-$C_3$ alkyl;
$R^2$ is H or $C_1$-$C_3$ alkyl;
$R^3$ is H, $C_1$-$C_3$ alkyl, or —Si($OR^1$)($OR^2$)-A-Y;
A is $C_1$-$C_3$ alkylene; and
Y at each occurrence is either the same or different, and is H or a group capable of free radical polymerization and containing at least one of: an unsaturated double bond; an epoxide ring; or an episulfide ring.

Alkyl substituent R may be substituted or unsubstituted. Advantageously, substituent R is methyl, due to the wide availability of the polydimethylsiloxane backbone starting material which is desirably used in the synthesis of the compositions of the invention.

The compositions of the invention are stable, and capable of rapid conversion from liquid to cured matrix. The compositions of the present invention cure to a flexible resin via free radical and RTV (room temperature vulcanization) mechanisms, and accordingly may undergo moisture and/or photoradiation cure. The compositions of the present invention may be subjected to ultraviolet light in the presence of a photo initiator to cure or gel the material.

Alternatively, the curing of the compositions of the present invention may be accomplished through moisture cure. Finally, both of these methods may be used to cure the compositions, resulting in a product that is both moisture and photoradiation cured. For example, the compositions of the invention may be subjected to UV light in the presence of a photoinitiator to partially cure or gel the material, which can then be allowed to cure further by moisture in ambient conditions. The cure rate of the compositions of the invention may be influenced by the identity of the reactive silicon substituents, as well as the type of catalyst and cure condition chosen.

RTV cure typically occurs through exposure of the compositions of the invention to moisture. The presence of alkoxy or other moisture curing groups on the silicone backbone permits the compositions of the invention to undergo moisture cure. Larger alkoxy groups such as propoxy and butoxy, are slower to react than smaller groups such as methoxy and ethoxy. Accordingly, the rate at which the compositions of the invention undergo moisture cure can be influenced by choosing the appropriately sized moisture cure group for substituents $R^1$, $R^2$, and $R^3$. A mixture of different groups can be positioned on a silicon atom to regulate the cure at that particular site. Advantageously, $R^1$, $R^2$, and $R^3$ are each methyl. In another advantageous aspect, $R^1$, $R^2$, and $R^3$ are each ethyl. Moreover, combinations of methyl and ethyl substituents are also contemplated as aspects of the invention.

Free radical curing advantageously occurs by means of exposure of the compositions of the invention to photoradiation. Conventionally, ultraviolet light and/or visible light is used to effect such a cure, but other forms of electromagnetic energy may also be used.

Substituents A and Y form a group which may be present at the terminal ends of the compositions of the invention, and may also be present as a pendent group along the length of the polymer. The -A-Y group allows the compositions of the present invention to undergo photoradiation cure.

The portion of the -A-Y group denoted by substituent Y, contains at least one functional group capable of free radical polymerization known to those skilled in the art. Desirably, Y contains at least one group selected from an: unsaturated double bond, epoxide ring, or episulfide ring. Y at each occurrence may be the same or different. Accordingly, a single polymer of the present invention may contain a variety of different functional groups encompassed by substituent Y. Examples of functional groups denoted by substituent Y include, but are not limited to: epoxy, vinyl, alkylvinyl, acryloxy, alkylacryloxy, allylic, alkylallylic, alkylvinyl, alkylalkynyl, and azo. Advantageously, the group denoted by substituent Y is methacryloxy. Furthermore, the group denoted by substituent A is advantageously methylene.

In a particularly advantageous aspect, the compositions of the present invention have the structure:

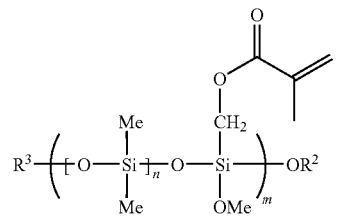

in which m, n, $R^2$, and $R^3$ are as discussed herein.

Still another aspect of the present invention provides a process for preparing the compositions of the invention, including the steps of:
a) reacting, in the presence of a base, at least one siloxane having the formula

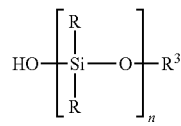

wherein
R is $C_1$-$C_3$ alkyl;
$R^3$ is H, $C_1$-$C_3$ alkyl, or —Si(OR$^1$)(OR$^2$)-A-Y; and
n is 10-2000;
b) with less than an equivalent of a silane having the formula

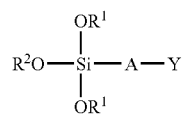

wherein
$R^1$ is H or $C_1$-$C_3$ alkyl;
$R^1$ is H or $C_1$-$C_3$ alkyl;
A is divalent $C_1$-$C_3$ alkylene; and
Y at each occurrence is either the same or different, and is H or a group capable of free radical polymerization and containing at least one of: an unsaturated double bond, an epoxide, or an episulfide ring.

The appropriate base may be any such appropriate base known to those skilled in the art. For example, the appropriate base may be a base such as lithium diisopropyl amine. Advantageously, the appropriate base is an alkyl base such as butyl lithium (BuLi). Other reagent bases may be employed, such as those described in U.S. Pat. No. 5,663,269, which is hereby incorporated in its entirety by reference. While the appropriate base may be present in any effective amount, desirable ranges include about 0.005 to about 1.5% by weight.

Table 1 shows formulations of typical compositions of the invention.

In regard to the process, and the siloxane and silane used therein, variable n, and substituents R, $R^1$, $R^2$, $R^3$, A, and Y are as described herein. Advantageously, R is methyl, $R^1$ is methyl or ethyl, $R^2$ is methyl or ethyl, $R^3$ is H or $C_1$-$C_3$ alkyl, A is methylene, and Y is methacryloxy. Moreover, the process of the invention allows for the use of mixtures of silanes in the reaction, providing polymers with various types of pendant functional groups, which allows for different cure properties. Siloxanes of the invention may be present in an amount ranging from about 30 to about 99% by weight. Silanes of the invention may be present in an amount ranging from about 0.2 to about 40% by weight. Siloxanes of the present invention are intended to include hydroxy-terminated polyalkylsiloxanes. Silanes of the present invention are intended to include trialkoxy $C_1$-$C_3$ alkylsilanes.

The invention also provides a method of controlling the viscosity of the compositions of the invention. The viscosity of the compositions of the invention may be reduced by increasing the concentration of the silane of step b) of the process shown above. Alternatively, the viscosity may be increased by reducing the silane concentration. Thus, the viscosity of a reactive polyorganosiloxane of the invention may be controlled via the steps of:

a) selecting an approximate desired viscosity of the reactive polyorganosiloxane to be made;
b) providing a hydroxy-terminated polyalkylsiloxane; and
c) reacting the hydroxy-terminated polyalkylsiloxane of step b) with a trialkoxy $C_1$-$C_3$ alkylsilane, wherein the trialkoxy $C_1$-$C_3$ alkylsilane is present in an amount such that the resulting reactive polyorganosiloxane has the desired viscosity.

Table 4 shows the effect that varying silane concentration has on the viscosity of the compositions of the invention. It appears that contamination in the mixers may lead to a higher viscosity product. As contamination is cleared from the system, a more reproducible end viscosity results. As can be seen in the table, increasing the silane concentration results in a decrease of the velocity. Increasing or decreasing the rotation speed of the spindle also results in an increase or decrease, respectively, of the composition viscosity.

The process of the invention also contemplates the formation of polymers with varying molecular weights. A polymer of a desired molecular weight may therefore be produced according to procedure of the invention by using pre-polymers differing weights may be used to accomplish this. Thus, in one aspect, in step a) of the process of the invention at least two siloxanes having different molecular weights are reacted.

The invention provides a method whereby control is gained over the molecular weight and/or the inclusion of functional groups in the formation of a reactive polyorganosiloxane, including the steps of:

a) selecting an approximate desired molecular weight of the reactive polyorganosiloxane to be made;
b) providing a hydroxy-terminated polyalkylsiloxane of desired molecular weight; and
c) reacting the hydroxy-terminated polyalkylsiloxane of step b) with an amount less than a molar equivalent of a trialkoxy $C_1$-$C_3$ alkylsilane for a time sufficient to form a chain extended reactive polymer having pendant functional groups along the polymer backbone.

The compositions of the present invention may optionally include a cure system, including photoinitiators, moisture-cure catalysts, and/or stabilizers.

The photoinitiators useful in the present invention may be selected from any known free radical type photoinitiator effective for promoting crosslinking reactions. For example, suitable photoinitiators include UV initiators such as benzophenone and substituted benzophenones, acetophenone and substituted acetophenones, benzoin and its alkylesters, xanthone and substituted xanthones. Desirable photoinitiators include diethoxyacetophenone (DEAP), benzoin methyl ether, benzoin ethyl ether, benzoin isopropyl ether, diethoxyxanthone, chloro-thioxanthone, azobisisobutyronitrile, N-methyl diethanolaminebenzophenone, and combinations thereof.

Useful UV radiation sources include conventional mercury-lamps designed to emit ultraviolet energy in various ultraviolet wavelength bands. For example, useful radiation wavelength ranges include 220 to 400 nm.

Visible light photoinitiators include camphoquinone peroxyester initiators, non-fluorene carboxylic acid peroxyester initiators and alkyl thioxanthones, such as isopropyl xanthone.

While the photoinitiator may be absent or present in any effective amount, desirable ranges include about 1 to about 10% by weight, such as 2 to about 6% by weight.

A further aspect of the invention relates to the cured polymer formed by the polymeric compositions of the reaction as a result of exposure to photoradiation.

The compositions of the present invention may also include moisture cure catalysts to enhance the rate at which the hydrolyzable groups cure by reaction with moisture. The moisture cure catalysts include organometallic catalysts, such as titanates. Examples of titanates include tetraisopropylorthotitanate and tetrabutoxyorthotitanate. The moisture cure catalysts also include metal carboxylates such as dibutyltin dilaurate, dibutyltin dioctoate and the like.

The moisture cure catalyst should be used in an amount sufficient to effectuate moisture cure, which desirably is in the range of about 0.1 to about 5% by weight.

A further aspect of the invention relates to the cured polymer formed by reaction of the polymeric compositions of the invention and a moisture cure catalyst upon exposure to moisture.

The compositions of the present invention may optionally include a stabilizer, which may be present in the range of 0 to about 5% by weight. A stabilizer useful for present invention is a hydroquinone.

A further aspect of the present invention provides a photoradiation and/or moisture curing composition that is the reaction product of:

a) at least one siloxane having the formula:

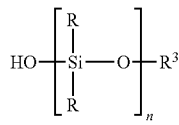

wherein
n is 10-2000;
R is $C_1$-$C_3$ alkyl; and
$R^3$ is H, $C_1$-$C_3$ alkyl, or —$Si(OR^1)(OR^2)$-A-Y; and b) less than one equivalent of a silane having the formula

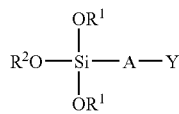

wherein
$R^1$ is H OR $C_1$-$C_3$ alkyl;
$R^2$ is H OR $C_1$-$C_3$ alkyl;
A is $C_1$-$C_3$ alkylene; and
Y at each occurrence is either the same or different, and is H or a group capable of free radical polymerization and containing at least one of: an unsaturated double bond; an epoxide ring; or an episulfide ring.

In regard to the photoradiation and/or moisture curing composition reaction product, and the siloxane and silane used to produce it, variable n, and substituents R, $R^1$, $R^2$, $R^3$, A, and Y are as described herein. Advantageously, R is methyl, $R^1$ is methyl or ethyl, $R^2$ is methyl or ethyl, $R^3$ is H or $C_1$-$C_3$ alkyl, A is methylene, and Y is methacryloxy.

EXAMPLES

An illustrative procedure for the preparation of compositions of the inventions is as follows:

PDMS (1500 g) was steam heated under vacuum using a #2 stirrer for one hour. The mixture was cooled to room temperature, and methacryloxymethyl trimethoxy silane (22.5 g) was added, whereupon the mixture was stirred under vacuum for 10 minutes using a #2 stirrer. Butyl lithium (0.3 g in hexanes, 1.6 Molar) was added directly to the mixture. Stirring was continued under vacuum for two hours. Methacryloxymethyl trimethoxy silane (12.0 g) was added and the mixture was stirred under vacuum for ten minutes.

Compositions of the present invention were prepared and tested for various properties.

TABLE 1

Table 1 shows formulations of typical compositions of the invention.

| Components | Sample A (%) | Sample B (%) | Sample C (%) |
|---|---|---|---|
| PDMS silanol terminated | 91.54 | 91 | 91.15 |
| Methacryloxy methyl trimethoxysilane | 2.01 | 2.1 | 2.187 |
| Butyl Lithium | 0.018 | 0.018 | 0.018 |
| Fumed silica | 5.49 | 5.46 | 5.47 |
| DEAP | 0.8 | 1.29 | 1.04 |
| Acrylic Acid | 0.092 | 0.09 | 0.09 |
| Tin Catalyst | 0.046 | 0.046 | 0.046 |
| Benzoquinone | | | 0.0018 |

TABLE 2

Table 2 shows cure depth of Sample B when subjected to UV irradiation (70 mj/cm²).
Sample B Depth of UV Irradiation Cure

| Time (sec.) | Depth (mm) |
|---|---|
| 15 | 5.94 |
| 30 | 7.13 |
| 60 | 8.45 |

TABLE 3

Table 3 shows cure depth of Sample B when subjected to moisture cure.
Sample B Depth of Moisture Cure

| Time (days) | Depth (mm) |
|---|---|
| 1 | 8.28 |
| 3 | 13.62 |

TABLE 4

Table 4 shows the effect silane concentration has on the viscosity of the resulting composition. Measurements were conducted using a Haake 20/2 spindle at 25° C.

| Silane Concentration (%) | Composition Viscosity (7/s cps) |
|---|---|
| 1.282 | 231,750 |
| 1.417 | 83,585 |
| 1.458 | 71,325 |
| 1.458 | 60,365 |
| 1.458 | 62,085 |
| 1.458 | 74,790 |
| 1.458 | 66,645 |

What is claimed is:

1. A photoradiation and/or moisture curing composition, comprising

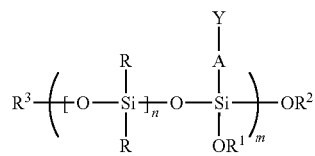

wherein
m is 10-2000;
n is 10-2000;

R in each occurrence can be the same or different and is a member selected from the group consisting of H and $C_1$-$C_3$ alkyl;
$R^1$ is a member selected from the group consisting of H and $C_1$-$C_3$ alkyl;
$R^2$ is a member selected from the group consisting of H and $C_1$-$C_3$ alkyl;
$R^3$ is
—Si($OR^1$)($OR^2$)-A-Y;
A is $C_1$-$C_3$ alkylene; and
Y at each occurrence is either the same or different, and is a group capable of free radical polymerization and containing at least one of: an unsaturated double bond; an epoxide ring; or an episulfide ring.

2. The composition of claim 1, wherein Y is selected from the group consisting of epoxy, vinyl, alkylvinyl, acryloxy, alkylacryloxy, allylic, alkylallylic, alkynyl, alkylalkynyl, and azo.

3. The composition of claim 1, wherein the compound has the formula

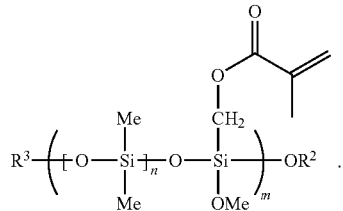

4. The composition of claim 1, further comprising a photoinitiator.

5. The composition of claim 1, further comprising a moisture-cure catalyst.

6. The composition of claim 1, further comprising a hydroquinone stabilizer.

7. A photoradiation and/or moisture curing silicone composition comprising the product of:
a) at least one siloxane having the formula:

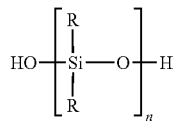

wherein
n is 10-2000; and
R is $C_1$-$C_3$ alkyl; and
b) a silane having the formula

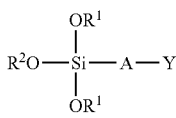

wherein
$R^1$ is a member selected from the group consisting of H and $C_1$-$C_3$ alkyl;
$R^2$ is a member selected from the group consisting of H and $C_1$-$C_3$ alkyl;
A is $C_1$-$C_3$ alkylene; and
Y is a group capable of free radical polymerization and containing at least one of: an unsaturated double bond; an epoxide ring; or an episulfide ring; and
wherein the total amount of silane exposed to the siloxane is less than one molar equivalent.

8. The reaction product of claim 7, wherein
R is methyl;
$R^1$ is methyl or ethyl;
$R^2$ is methyl or ethyl;
A is methylene; and
Y is methacryloxy.

9. The composition of claim 7, wherein the siloxane of a) and the silane of b) react in the presence of an appropriate base.

10. The composition of claim 9, wherein the appropriate base is butyl lithium.

11. A process for preparing the composition of claim 1, comprising the steps of:
a) reacting in the presence of a base at least one siloxane having the formula

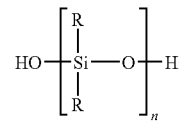

wherein
R is $C_1$-$C_3$ alkyl;
and
n is 10-2000;
b) with a silane having the formula

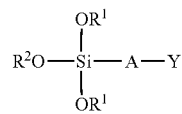

wherein
$R^1$ is a member selected from the group consisting of H and $C_1$-$C_3$ alkyl;
$R^2$ is a member selected from the group consisting of H and $C_1$-$C_3$ alkyl;
A is $C_1$-$C_3$ alkylene; and
Y is a group capable of free radical polymerization and containing at least one of: an unsaturated double bond; an epoxide ring; or an episulfide ring; and
wherein the total amount of silane exposed to the siloxane is less than one molar equivalent.

12. The process of claim 11, wherein
R is methyl;
$R^1$ is methyl or ethyl;
$R^2$ is methyl or ethyl;
A is methylene; and
Y is methacryloxy.

13. The process of claim 11, wherein step a) comprises reacting at least two of said siloxanes, wherein said siloxanes have different molecular weights.

14. The reaction product of the composition of claim 5.

15. The reaction product of the composition of claim 1 upon exposure to photoradiation.

16. The reaction product of claim 1 upon exposure to moisture.

17. A method of controlling the molecular weight and/or the inclusion of functional groups in the formation of a reactive polyorganosiloxane composition comprising the steps of:
  a) selecting an approximate desired molecular weight of the reactive polyorganosiloxane composition to be made;
  b) providing a hydroxy-terminated polyalkylsiloxane of desired molecular weight;
  c) providing a trialkoxy $C_1$-$C_3$ alkylsilane in an amount less than one molar equivalent; and
  d) reacting the hydroxy-terminated polyalkylsiloxane of step b) with the trialkoxy $C_1$-$C_3$ alkylsilane of step c) for a time sufficient to form a chain extended reactive polymer having pendant functional groups along the polymer backbone, wherein the total amount of silane exposed to the hydroxy-terminated polyalkylsiloxane is less than one molar equivalent and wherein the resulting reactive polyorganosiloxane composition has at least one of: (i) the desired molecular weight; or (ii) the desired functional groups.

18. A method for using composition of claim 1 to join or seal two substrates comprising the steps of:
  a) applying the composition to at least one of two substrate surfaces;
  b) mating the two substrate surfaces in an abutting relationship to form an assembly;
  c) exposing the composition to moisture and/or photoradiation; and
  d) maintaining the abutting relationship for a time sufficient to allow the composition to cure.

19. A method of controlling the viscosity of a reactive polyorganosiloxane composition comprising the steps of:
  a) selecting an approximate desired viscosity of the reactive polyorganosiloxane composition to be made;
  b) providing a hydroxy-terminated polyalkylsiloxane;
  c) providing a trialkoxy $C_1$-$C_3$ alkylsilane in an amount less than one molar equivalent; and
  d) reacting the hydroxy-terminated polyalkylsiloxane of step b) with the trialkoxy $C_1$-$C_3$ alkylsilane of step c) for a time sufficient to form a chain extended reactive polymer having pendant functional groups along the polymer backbone, wherein the total amount of silane exposed to the hydroxy-terminated polyalkylsiloxane is less than one molar equivalent and wherein the resulting reactive polyorganosiloxane composition has the desired viscosity.

* * * * *